US007050578B1

(12) United States Patent
Watanabe

(10) Patent No.: US 7,050,578 B1
(45) Date of Patent: May 23, 2006

(54) SOUND PRODUCING DEVICE FOR AN ELECTRONIC INSTRUMENT SUCH AS A TELEPHONE

(75) Inventor: Shigehisa Watanabe, Fujiyoshida (JP)

(73) Assignee: Citizen Electronics Co., Ltd., Fujiyoshida (JP)

( * ) Notice: Subject to any disclaimer, the term of this patent is extended or adjusted under 35 U.S.C. 154(b) by 486 days.

(21) Appl. No.: 09/691,216

(22) Filed: Oct. 19, 2000

(30) Foreign Application Priority Data

Oct. 22, 1999 (JP) .......................................... 11-301767

(51) Int. Cl.
*H04M 1/00* (2006.01)

(52) U.S. Cl. .............................. 379/433.02; 379/420.02

(58) Field of Classification Search ............ 379/433.02, 379/420.02, 430; 381/338, 368
See application file for complete search history.

(56) References Cited

U.S. PATENT DOCUMENTS 4,588,867 A * 5/1986 Konomi ...................... 379/430
4,720,857 A * 1/1988 Burris et al. ................ 379/430
6,061,459 A * 5/2000 Kobayashi et al. .... 379/433.02

FOREIGN PATENT DOCUMENTS

CN 2272604 Y 1/1998
CN 1278636 A 1/2001

* cited by examiner

*Primary Examiner*—Jack Chiang
(74) *Attorney, Agent, or Firm*—Birch, Stewart, Kolasch & Birch, LLP

(57) ABSTRACT

A sound producing device has an electroacoustic transducer mounted in a case. A sound discharging nozzle is projected from the case and communicated with an upper chamber above the electroacoustic transducer.

3 Claims, 3 Drawing Sheets

SOUND PRODUCING DEVICE FOR AN ELECTRONIC INSTRUMENT SUCH AS A TELEPHONE

BACKGROUND OF THE INVENTION

The present invention relates to a sound producing device and an electronic instrument provided with the sound producing device.

An electronic instrument such as a portable telephone is provided with a sound producing device having a sound producer for producing telephone ring. The sound producing device is mounted in a case of the electronic instrument.

The sound emitted from the sound producing device is reflected from walls in the case. Consequently, reflected sound waves interfere with each other or are attenuated, which renders the sound to be indistinct. The attenuation of the sound waves causes the sound pressure to reduce. If the sound pressure reduces in the portable telephone, the telephone ring can not be confirmed.

In order to resolve the above described problems, it is necessary to emit the sound without leaking the sound in the case.

FIG. 5 shows a conventional sound producing device having a device for preventing the leakage of the sound. A sound producing device 1 is securely mounted on a substrate 2 secured to a case 3 of a portable telephone as an electronic instrument. The sound producing device 1 has a buzzer (not shown) as an electroacoustic transducer.

The sound producing device 1 has a sound discharge hole 1*a*, and the case 3 has a sound discharge hole 3*a* opposite the sound discharge hole 1*a*. A sound guide pipe 5 is provided between walls surrounding the sound discharge holes 1*a* and 3*a* so as to discharge the emitted sound without leaking in the case 3.

However, the sound guide pipe 5 causes the number of parts of the sound producing device 1 and the number of steps for manufacturing the device to increase. Further, it is difficult to accurately coincide the sound guide pipe with both the holes 1*a* and 3*a*.

SUMMARY OF THE INVENTION

An object of the present invention is to provide sound producing device which is simple in construction.

Another object of the present invention is to provide an electronic instrument which can be easily manufactured.

According to the present invention, there is provided a sound producing device to be mounted in an electronic instrument, comprising a case, an electroacoustic transducer mounted in the case, and a sound discharging nozzle projected from the case and communicated with an upper chamber above the electroacoustic transducer so as to discharge a sound produced by the electroacoustic transducer.

The device further comprises a substrate secured to the case and mounting the electroacoustic transducer, the nozzle is projected from the case in parallel with the substrate.

The present invention further provides an electronic instrument comprising a first case, a sound producing device mounted in the first case, the sound producing device comprising a second case, and electroacoustic transducer mounted in the second case and a sound discharging nozzle projected from the case and communicated with an upper chamber above the electroacoustic transducer so as to discharge a sound produced by the electroacoustic transducer, the sound discharging nozzle being inserted in an opening formed in the first case.

The first case comprises an upper case and a lower case, the upper case has a downward recess, the opening is formed by combining the upper case and the lower case.

These and other objects and features of the present invention will become more apparent from the following detailed description with reference to the accompanying drawings.

DETAILED DESCRIPTION OF THE PREFERRED EMBODIMENT

Figure 1:
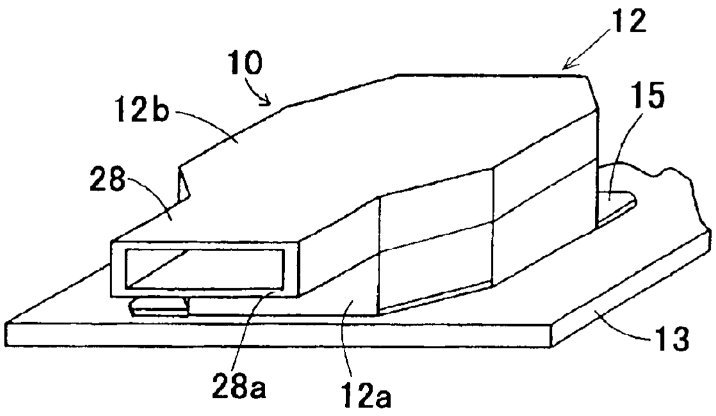
FIG. 1 is a perspective view showing a sound producing device according to the present invention.
Figure 2A:
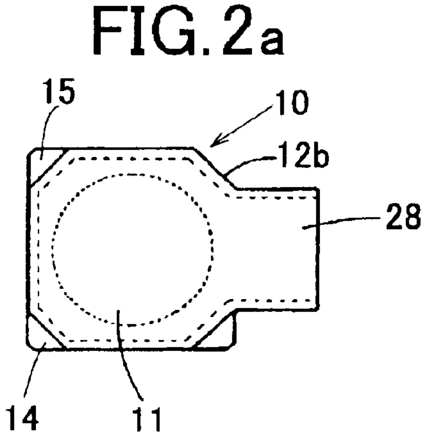
FIG. 2*a* is a plan view of the sound producing device according to the present invention.
Figure 2B:
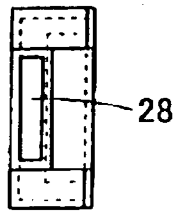
FIG. 2*b* is a front view of the sound producing device according to the present invention.
Figure 2C:
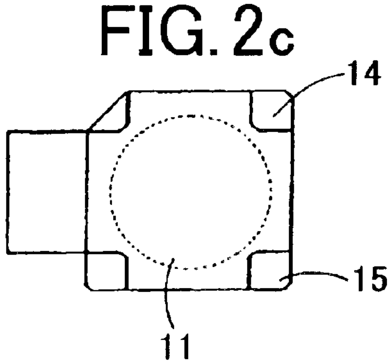
FIG. 2*c* is a reverse view of the sound producing device according to the present invention.
Figure 2D:
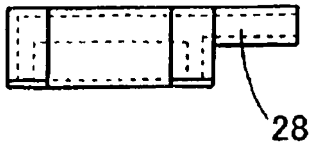
FIG. 2*d* is a side view of the sound producing device according to the present invention.
Figure 3:
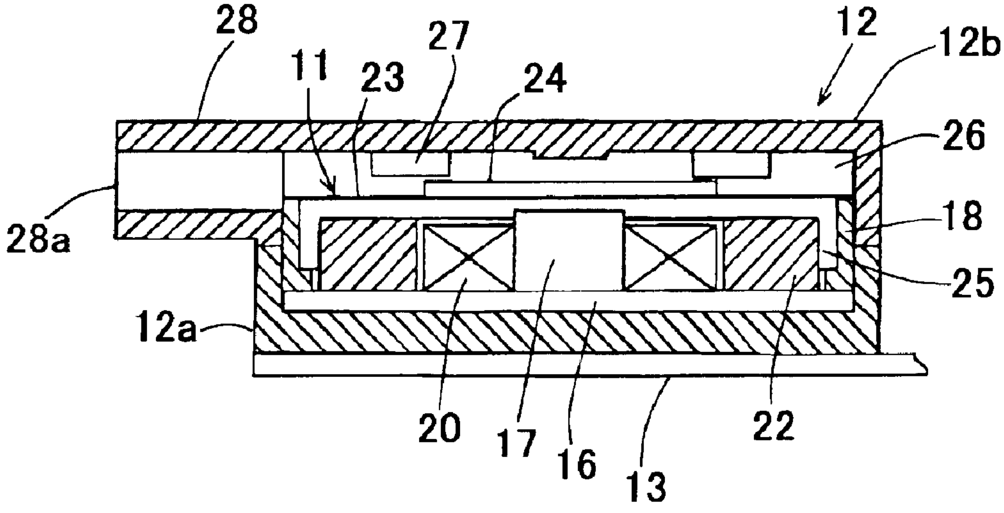
FIG. 3 is an enlarged sectional side view of the sound producing device according to the present invention.

Referring to FIGS. 1 to 3, an electromagnetic sound producing device 10 according to the present invention comprises a buzzer 11 as an electroacoustic transducer parts, which buzzer is contained in a casing 12. The case 12 comprises a plastic lower casing 12*a* secured to a substrate 13 and an upper plastic casing 12*b* fixed to the lower casing 12*a*. The four corners of the peripheral wall are chamfered, as shown in FIG. 2*a*.

Referring to FIG. 2*c* externally connecting terminals 14 and 15 are projected from the lower case 12*a*. The externally connecting terminals 14 and 15 are provided to connect a coil of the sound producing device with a circuit formed on the substrate 13.

Referring to FIG. 3, the buzzer 11 comprises a magnetic yoke 16 secured to the lower casing 12*a* and having a center pole 17, and an armature supporting cylinder 18 made of brass securely mounted on the yoke 16 with adhesive. A coil 20 is mounted on the yoke 16, coaxial with the center pole 17. By mounting the coil, both ends of the coil are electrically connected to the respective externally connecting terminals 14 and 15 through inside terminals (not shown). A cylindrical permanent magnet 22 which is vertically magnetized is disposed on the yoke 16 so as to surround the coil 20.

An armature 23 having a weight 24 secured on the surface at the center thereof is mounted on the upper edge of the supporting cylinder 18 and attracted by the magnetic force of the permanent magnet 22 thereby defining a lower chamber 25 and an upper chamber 26 in the space inside the lower and upper casings 12*a* and 12*b*. The yoke 16, coil 20 and the permanent magnet 22 compose an actuator for driving the armature 23. The armature 23 is normally attracted to the supporting cylinder 18 by the magnetomotive force of the permanent magnet 22.

The upper casing 12*b* has a shape similar to that of the lower casing 12*a*. A plurality of armature stoppers 27 are formed on the underside of the upper case 12*b*, forming a small gap between the lower surfaces of stoppers 27 and the armature 23.

In accordance with the present invention, the sound producing device is provided with a sound discharging nozzle 28 having a rectangular sectional shape and projected from the upper casing 12*b* in parallel with the substrate 13 and communicated with the upper chamber 26.

Referring to 4*a*, the sound producing device 10 of present invention is mounted in a case 30 of a portable telephone. The case 30 comprises an upper case 30*a* and a lower case 30*b*. The upper case 30*a* has a downward recess 30*c*. Thus, by combining the upper and lower cases 30*a* and 30*b*, an opening 32 is formed. The opening 32 has a shape so as to receive the nozzle 28 of the sound producing device 10.

The substrate 13 of the sound producing device 10 is secured to a base 31 of the lower case 30*b*. The sound Off discharging nozzle 28 of the sound producing device 10 is mounted on the edge of the lower case 30*b*. When the upper case 30*a* is engaged with the lower case 30*b*, the downward recess 30*c* covers the nozzle 28. As a result, the nozzle 28 is inserted in the opening 32. In the assembled state, the opening end 28*a* (FIG. 1) of the nozzle 28 coincides with an opening end 32*a* of the opening 32.

In operation, the sound produced by the sound producing device 10 is discharged from the opening end 28*a* of the nozzle 28. Since the opening end 28*a* of the nozzle 28 is opened at the opening end 32*a* of the opening 32, the sound is entirely discharged from the case 30 without leaking in the case. Thus, clear sound emits from the nozzle 28.

Figure 4A:
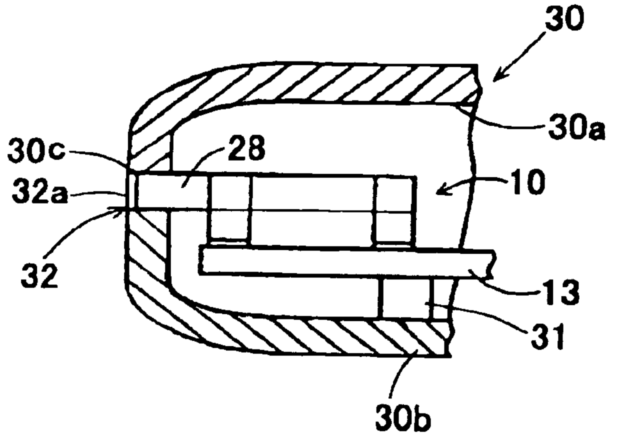
FIG. 4*a* is a sectional side view of an electronic instrument according to a first embodiment of the present invention.
Figure 4B:
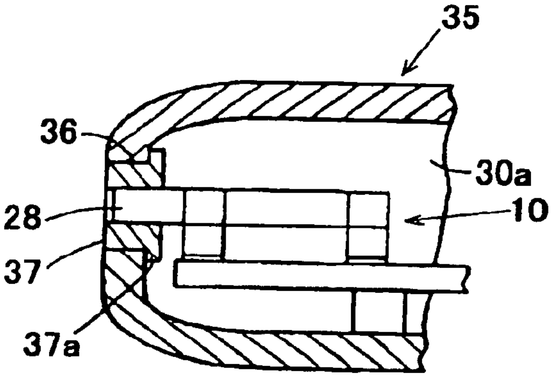
FIG. 4*b* is a sectional side view of an electronic instrument according to a second embodiment of the present invention.
Figure 5:
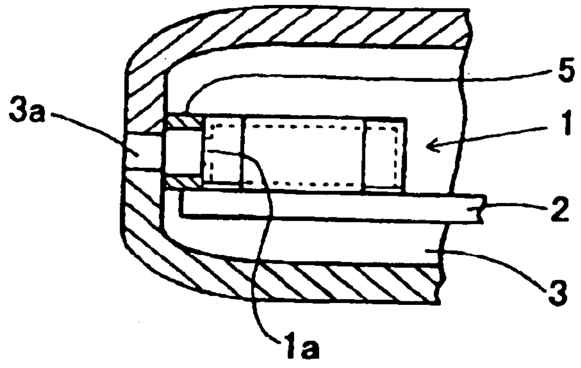
FIG. 5 PRIOR ART
FIG. 5 is a sectional side view of a conventional electronic instrument.

Referring to FIG. 4*b* showing the second embodiment of the present invention, a case 35 of a portable telephone has an opening 36 having a larger diameter than that of the first embodiment in the opening 36, a cylindrical cushion 37 having a flange 37*a* is secured with adhesive. The sound producing device 10 is the same as the first embodiment in construction and operation. The nozzle 28 of the sound producing device 10 is inserted in the cushion 37.

In the second embodiment of the present invention, since the cushion 37 holds the nozzle 28, if the portable telephone drops, the nozzle is prevented from breaking.

In accordance with the present invention, since the sound guide pipe is not provided between the case of the electronic instrument and the sound producing device, the electronic instrument can be easily manufactured.

While the invention has been described in conjunction with preferred specific embodiment thereof, it will be understood that this description is intended to illustrate and not limit the scope of the invention, which is defined by the following claims.

What is claimed is:

1. A portable telephone comprising:

a telephone case;

the telephone case having an opening formed in a sidewall thereof;

a calling signal sound producing device having an independent casing and set in the telephone case;

wherein the casing of the sound producing device comprises an upper casing and lower casing engaged with the upper casing, the upper casing being provided for receiving the sound emitted from the sound producing device, both side corners of a front side of the upper casing being chamfered to form a tapered portion, and a nozzle being formed by horizontally extending a front end of the tapered portion of the upper casing, the nozzle having a flat rectangular opening end, and being communicated with the upper casing so as to discharge the sound, and the nozzle is inserted in the opening of the telephone case, so that an opening end of the nozzle is opened at an opening end of the opening of the telephone case.

2. The portable telephone according to claim 1, further comprising a cylindrical cushion provided between an inside wall of the opening and an outside wall of the sound discharging nozzle.

3. The portable telephone according to claim 1, further comprising:

a substrate secured to an underside of the lower casing;

two chamfered portions being formed at both side corners of a rear side of the casing; and a pair of externally connecting terminals being provided by projecting from the lower casing at chamfered portions so as to be connected with a circuit provided on the substrate.

* * * * *